Patented Mar. 7, 1950

2,500,005

UNITED STATES PATENT OFFICE 2,500,005

PRODUCTION OF ESTERS OF UNSATURATED LOWER FATTY ACIDS

Richard O. Norris, Chicago, Ill., assignor to Sinclair Refining Company, New York, N. Y., a corporation of Maine No Drawing. Application August 17, 1946, Serial No. 691,388

1 Claim. (Cl. 260—486)

This invention relates to an improved process for the production of esters of unsaturated fatty acids, in particular the lower fatty acids, such as crotonic and acrylic acid.

In accordance with the present invention, these esters are prepared by the dehydrochlorination of the esters of chlorofatty acids, in particular the lower fatty acids having six carbon atoms or less, by the use of ammonia in an organic solvent such as alcohol. The reaction proceeds readily at ordinary temperatures, and the unsaturated esters are obtained in good yield.

The invention will be illustrated by the following example, but it is not limited thereto:

*Example.*—To 200 parts of a 10% solution of ammonia in alcohol were added 150 parts of ethyl 3-chlorobutyrate slowly and with stirring, the addition taking place over a period of several hours. Ammonium chloride separated by precipitation. The ammonium chloride was filtered off and the reaction mixture fractionated. Ethyl crotonate, boiling point 143–147° C./atm. was obtained in 79% yield. The same procedure applied to ethyl 2-chloropropionate gave ethyl acrylate, boiling point 98.5° C./atm. in 55% yield.

The esters obtained are useful as solvents, or for preparing perfumes, flavoring materials, etc.

I claim:

In a process for producing esters of unsaturated lower fatty acids the improvement which comprises reacting an ester of a monochlor lower fatty acid with ammonia in an alcoholic solution at a temperature approximating ordinary room temperature.

RICHARD O. NORRIS.

REFERENCES CITED

The following references are of record in the file of this patent:

UNITED STATES PATENTS

| Number    | Name    | Date           |
|-----------|---------|----------------|
| 1,864,884 | Bauer   | June 28, 1932  |
| 2,013,618 | Barrett | Sept. 10, 1935 |
| 2,109,929 | Rigby   | Mar. 1, 1938   |
| 2,386,694 | Lichty  | Oct. 9, 1945   |

OTHER REFERENCES

Moureu et al.: "Annales des Chem.," vol. 15 (9th series), p. 241, 1921.

Sudborough et al.: "Jour. Chem. Soc.," (London), vol. 95 (1909), page 977.

Drake et al.: "Jour. Am. Chem. Soc.," vol. 56 (1934), pages 697 to 700.